(12) United States Patent
Knowles

(10) Patent No.: US 9,658,719 B2
(45) Date of Patent: May 23, 2017

(54) TOUCH SCREEN WITH ACOUSTIC MODE REFLECTIVE AND CONVERSION ARRAYS

(71) Applicant: STREET SMART SENSORS LLC, Austin, TX (US)

(72) Inventor: Terence J. Knowles, Lake Barrington, IL (US)

(73) Assignee: STREET SMART SENSORS LLC, Austin, TX (US)

( * ) Notice: Subject to any disclaimer, the term of this patent is extended or adjusted under 35 U.S.C. 154(b) by 0 days.

(21) Appl. No.: 13/709,892

(22) Filed: Dec. 10, 2012

(65) Prior Publication Data

US 2013/0147769 A1 Jun. 13, 2013

Related U.S. Application Data

(60) Provisional application No. 61/568,852, filed on Dec. 9, 2011.

(51) Int. Cl.
*G06F 3/043* (2006.01)

(52) U.S. Cl.
CPC ............ *G06F 3/043* (2013.01); *G06F 3/0436* (2013.01)

(58) Field of Classification Search
CPC ............................... G06F 3/0436; G06F 3/042
USPC ........................................ 345/177; 178/18.04
See application file for complete search history.

(56) References Cited

U.S. PATENT DOCUMENTS

| 5,243,148 | A | * | 9/1993 | Knowles | G06F 3/0436 |
| | | | | | 178/18.04 |
| 5,451,723 | A | * | 9/1995 | Huang | G06F 3/0436 |
| | | | | | 178/18.04 |
| 5,591,945 | A | * | 1/1997 | Kent | G06F 3/0418 |
| | | | | | 178/18.04 |
| 5,739,479 | A | * | 4/1998 | Davis-Cannon | G06F 3/0436 |
| | | | | | 178/18.04 |
| 6,313,829 | B1 | * | 11/2001 | Tolt | G06F 3/043 |
| | | | | | 178/18.01 |
| 2002/0171635 | A1 | * | 11/2002 | Takahashi et al. | 345/177 |
| 2009/0303745 | A1 | * | 12/2009 | Pakhchyan | G02B 6/0046 |
| | | | | | 362/616 |
| 2010/0156803 | A1 | * | 6/2010 | Wu | G06F 3/0202 |
| | | | | | 345/172 |

OTHER PUBLICATIONS

The International Search Report and the Written Opinion of the International Searching Authority issued Feb. 21, 2013 for corresponding PCT/US2012/068783.

* cited by examiner

*Primary Examiner* — Andrew Sasinowski
*Assistant Examiner* — Brent D Castiaux
(74) *Attorney, Agent, or Firm* — Levenfeld Pearlstein, LLC

(57) ABSTRACT

A touch panel includes a first plurality of echelons arranged on a substrate along a first centerline at a first angle and a second plurality of echelons arranged on a substrate along a second centerline at a second angle. A first wave generator on an end of the substrate is configured to transmit a first wave along the first centerline of the first plurality of echelons and a second wave generator on an end of the substrate is configured to transmit a second wave along the second centerline of the second plurality of echelons. First and second trapping slots are positioned parallel to their respective plurality of echelons.

23 Claims, 11 Drawing Sheets

TOUCH SCREEN WITH ACOUSTIC MODE REFLECTIVE AND CONVERSION ARRAYS

BACKGROUND

Conventional touch panels and touch screens utilize electrical resistance, electrical capacitance, infra-red light, or surface acoustic waves to determine when an object has contacted the surface of the touch panel. Acoustic wave touch panels use principally out of plane acoustic wave motion to detect contact between the touch panel and an object. However, out of plane acoustic waves are sensitive to liquid and sealing compounds on the touch surface.

Acoustic wave touch panels utilizing in plane acoustic waves have been developed to address the problems of out of plane acoustic touch panels. However, these panels are limited to applications where the frequency thickness product of the touch panel is less than 2.5 MHz-mm for single mode operation, which necessitates a substrate thickness of 1 mm or less. Consequently, in plane acoustic wave touch panels generally require a laminated backing substrate for strength. In addition, a wave generator is restricted to being positioned on an edge of the substrate, or sensing film, of the in plane acoustic touch panels, for proper operation. As a result, in plane acoustic touch panels have not enjoyed commercial success.

To overcome these issues, some acoustic touch panels incorporate acoustic in plane motion in a series of acoustic switches to determine regions where an object comes into contact with the touch panel. These touch panels include a plurality of acoustic touch switches that are arranged across the surface of the touch panel. Each acoustic switch is coupled to a respective in plane overtone mode wave generator, which transmits a wave that is trapped in a cavity in each acoustic switch. As an object makes contact with one or more of the acoustic switches, the corresponding wave generators for those switches determine the region where the object has contacted the touch panel. Because each switch is coupled to a wave generator, a touch panel utilizing acoustic touch switches can be manufactured with the wave generator positioned on the top surface of the touch panel. Further, the acoustic touch switches can be incorporated into panels having a frequency thickness product much larger than 2.5 MHz-mm. However, because each acoustic touch switch requires a wave generator, the cost and complexities of these touch panels is cost prohibitive.

Accordingly, a need exists for an acoustic touch panel having a reduced number of transducers that operates on a touch panel having a frequency to thickness product larger than 2.5 MHz-mm.

SUMMARY

Various embodiments of the present disclosure provide a touch panel including a first plurality of echelons arranged on a substrate along a first centerline at a first angle, a first wave generator mounted on the substrate surface on one side of the first plurality of echelons that is configured to transmit a first wave of substantially in plane motion greater than zeroth order transverse to and along the first centerline of the first plurality of echelons, and a second plurality of echelons arranged on a substrate along a second centerline at a second angle. A second wave generator on one end of the substrate is configured to transmit a second wave of substantially in plane motion greater than zeroth order transverse to and along the second centerline of the second plurality of echelons with a first trapping slot positioned parallel to the first plurality of echelons, and a second trapping slot positioned parallel to the second plurality of echelons.

Another embodiment of the present disclosure provides a touch panel including a first plurality of echelons arranged on a substrate along a first centerline at a first angle, a second plurality of echelons arranged on the substrate along a second centerline at a second angle, a wave generator on one end of the first plurality of echelons configured to transmit a wave along the first centerline of the first plurality of echelons, a redirecting echelon between the first plurality of echelons and the second plurality of echelons that is configured to direct a wave from the wave generator to the second plurality of echelons, a first trapping slot positioned parallel to the first plurality of echelons, a second trapping slot positioned parallel to the second plurality of echelons, and a second wave generator on one end of the substrate configured to transmit a wave along the second centerline of the second plurality of echelons. A first trapping slot positioned parallel to the first plurality of echelons.

Another embodiment of the present disclosure provides a touch panel that includes a first plurality of echelons arranged on a substrate along a first centerline at a first angle that converts in plane transverse waves greater than the zeroth order from a wave generator at the end of the array, to out of plane waves substantially at right angles to the centerline. A second plurality of echelons along a second centerline, is parallel and adjacent to the first centerline, at a second angle that converts out of plane waves generated by the first array to in plane waves directed to a wave generator at the end of the second array. Multiple pairs of first and second arrays are displaced at right angles to array centerlines to form touch sensitive rows.

Another embodiment of the present disclosure provides a touch panel that includes a first plurality of echelons arranged on a substrate along a first centerline at a first angle, a second plurality of echelons arranged on the substrate along a second centerline at a second angle, a wave generator on one end of the first plurality of echelons configured to transmit a wave along the first centerline of the first plurality of echelons, a first redirecting echelon on the first centerline adjacent to an echelon of the first plurality of echelons furthest from the wave generator, a second redirecting echelon on the second centerline positioned to direct the wave from the first redirecting echelon to the second plurality of echelons, a first trapping slot positioned parallel to the first plurality of echelons, a plurality of first touch areas positioned between the first trapping slot and the first plurality of echelons, a plurality of light emitting elements positioned on a side of the first trapping slot opposite the side closest to the first touch areas, a second trapping slot positioned parallel to the second plurality of echelons, and a plurality of second touch areas positioned between the second trapping slot and the second plurality of echelons, and a plurality of light emitting elements positioned on a side of the second trapping slot opposite the side closest to the second touch areas.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1A:
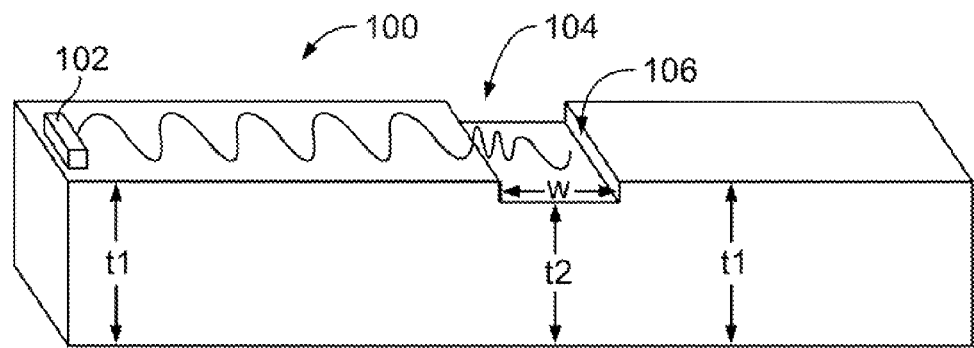
FIG. 1A is a perspective view of a plate including a wave generator and a trapping slot.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1A illustrates a plate 100 including a wave generator 102 and a trapping slot 104. The wave generator 102 is mounted to a top surface of the plate 100, and is selected to generate waves that propagate down the substrate 100 at different overtones. The wave generator 102 may be a shear wave generator or transducer. The terms "overtone," "order," and "mode" are meant to have the same meaning, and are used interchangeably herein. By mounting the wave generator 102 to the top surface of the plate 100, the wave generator 102 may produce a wave of the zeroth order that propagates along and within the substrate 100.

The precise order of the wave is a function of the thickness, the elastic properties of the substrate and the experimentally determined resonant frequency of the wave generating transducer. The substrate must be sufficiently thick to support a given order according to the formula:

$$t1 > (Vs)(n)/2f,$$ (Eq. 1)

where Vs is the bulk shear wave velocity, n is the mode order, and f is the operating frequency.

In practice it is desirable to operate with a wave order that is lower than the highest allowed by the formula to reduce the effects of the dispersion, which decrease the higher the operating frequency above cut-off.

Single mode operation is very desirable, and it has been found experimentally that selecting an appropriate resonant frequency for the wave generating transducer diminishes the generation of wave orders higher than the one desired, even though higher wave orders are allowed via the formula. Higher and lower order modes other than the desired order are further suppressed by the action of the array, as described below.

A wave of a given order may be confined or trapped in a region simply by reducing the substrate thickness at the boundary of the region. It is sufficient to have the reduced thickness region be of the order of a wavelength in width for it to be an effective reflector, and is defined for purposes of the disclosure as a trapping slot. These slots are useful to define a touch sensitive region within a larger substrate such as, for example, an appliance panel.

The trapping slot 104 is positioned in a region of the plate 100 opposite the wave generator 102. The trapping slot 104 is formed in the plate 100 such that the thickness $t_2$ of the substrate below the trapping slot 104 is less than the thickness $t_1$ of the substrate in regions around the trapping slot 104. At least one side surface 106 of the trapping slot 104 is configured to reflect a wave back toward the wave generator 102. The depth and width of the trapping slot 104 are set such that the frequency thickness characteristic of the substrate below the trapping slot 104 prevents a higher order wave, generated from the wave generator 102, from propagating beyond the trapping slot 104. To trap a higher order wave, the width (w) of the trapping slot 104 is set to approximately twice, or more, of the wavelength of the higher order wave generated by the wave generation. Further, the depth of the trapping slot 104 is set to satisfy the equation:

$$t_2 = f_d/f_x$$ (Eq. 2)

where $t_2$ is the thickness of the substrate below the trapping slot, $f_d$ is the cut off thickness frequency for the higher order wave, and $f_x$ is the frequency of the higher order wave.

When these conditions are satisfied, the higher order wave will not propagate beyond the trapping slot 104.

Figure 1B:
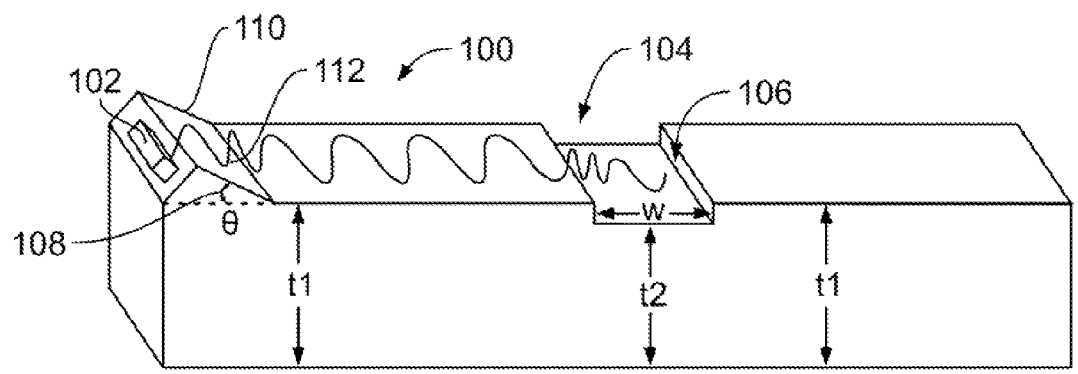
FIG. 1B is a perspective view of the plate of FIG. 1B including a wave generator positioned on a wedge.

FIG. 1B illustrates the substrate 100 with the wave generator 102 positioned on a wedge 108. The wedge 108 includes a front face 110 that extends from the top surface of the substrate 100 by an angle Θ. The wave generator 102 is positioned on a side of the wedge 108 such that the wave generator 102 transmits a wave 112 along the front face 110 of the wedge 108. The substrate 100 may be a panel in an appliance, such as a microwave oven, and the wedge 108 may be an extension used to secure the substrate 100 to the appliance. By positioning the wave generator 102 on the wedge 108, the wave generator 102 may produce higher order in plane waves.

Figure 2A:
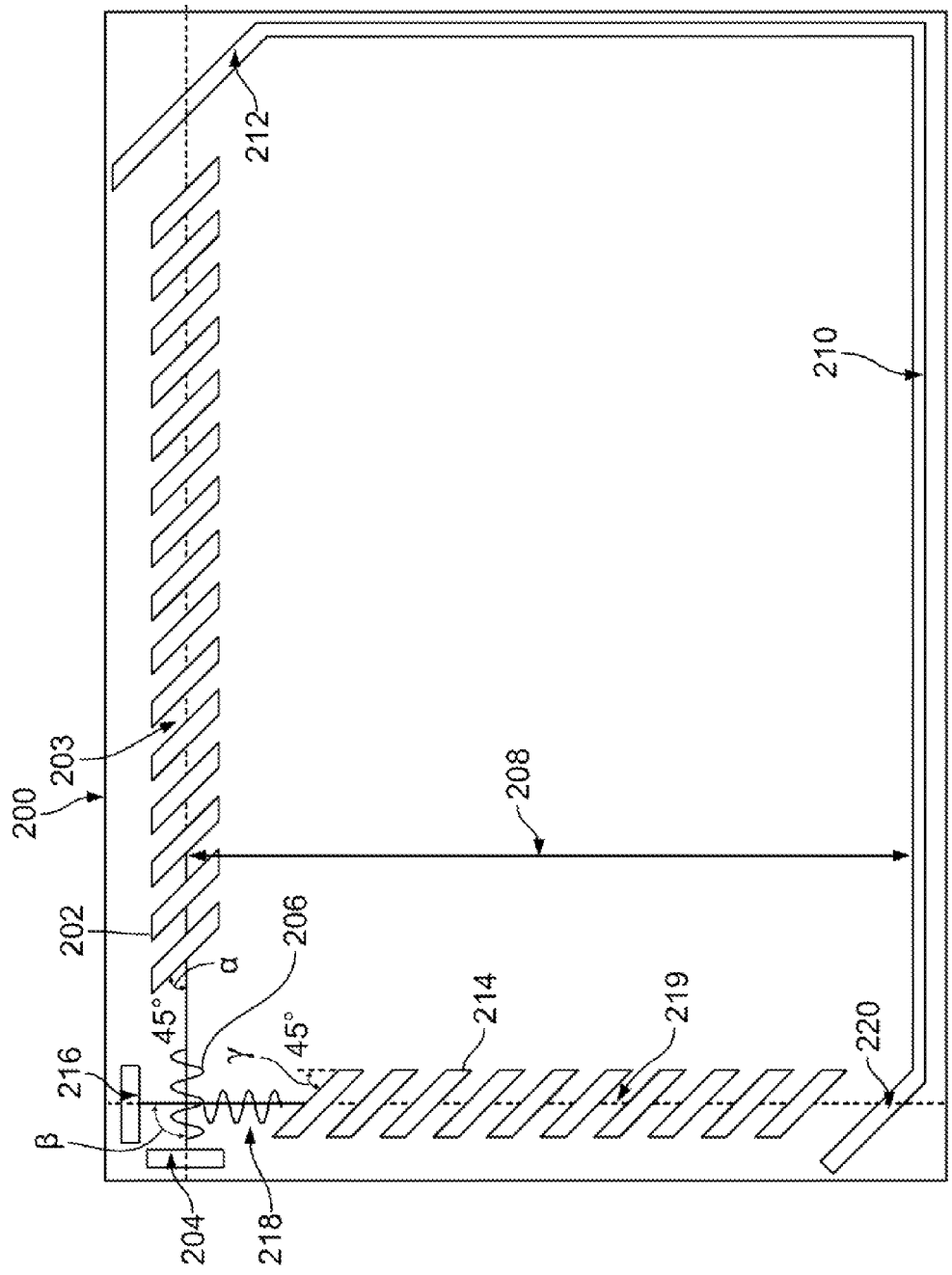
FIG. 2A illustrates a touch panel having two wave generators and a trapping slot.

FIG. 2A shows one embodiment of a touch panel 200 having a first plurality of echelons 202 arranged along a first centerline 203, with each echelon 202 in the first plurality of echelons 202 being separated from adjacent echelons 202 by substantially equal distances. The echelons 202 may be separated by a distance approximately equal to one half of the wavelength of a wave 206 generated by a first wave generator 204. The width of each echelon 202 may be set to approximately one half the wavelength of the wave 206 generated by the first wave generator 204. Each echelon 202 may also be positioned at an angle α from the first centerline 203, with the angle being approximately 45 degrees, approximately 39.1 degrees, or any other value that directs or converts a portion of the wave 206 when the wave 206 contacts an echelon 202.

The first wave generator 204 is positioned on the touch panel 200 at one end of the first plurality of echelons 202 such that the first wave generator 204 transmits the wave 206 that propagates along the first centerline 203 of the first plurality of echelons 202. The wave 206 may be a higher order in plane transverse wave or any other wave form or order.

As the wave 206 contacts each of the plurality of first echelons 202, each echelon 202 directs the wave 208 towards a trapping slot 210 positioned on a side of the touch panel 200 opposite the first plurality of echelons 202. Depending upon the angle of the echelon with respect to the centerline of the array, the echelon may direct the incoming wave toward the trapping slot 210 or convert the incoming wave to another mode or another type of wave and direct it toward the trapping slot 210. The trapping slot 210 prevents the wave 208 from propagating beyond the trapping slot 210. A reflective side surface in the trapping slot 210 reflects the wave 208 back toward the echelon 202, which then directs the wave 206 back to the first wave generator 204. An end trapping slot 212 is positioned along the first centerline 203 after the last echelon in the first plurality of echelons 202. The end trapping slot 212 is positioned at the same angle relative to the first centerline as the first plurality of echelons 202. When the wave 206 propagates beyond the last echelon of the first plurality of echelons 202, a reflective surface in the end trapping slot 212 reflects the wave 206 back to the wave generator 204.

A second plurality of echelons 214 is arranged along a second centerline 219, with each of the echelons 214 in the second plurality of echelons being separated by substantially the same distance. The second centerline 219 is positioned at an angle θ in relation to the first centerline 203; the second centerline 219 may be substantially orthogonal to the first centerline 203. A second wave generator 216 is positioned on one end of the plurality of second echelons 214 such that the second wave generator 214 transmits a wave 218 along the second centerline 219. The width of each echelon 214 may be set to approximately one half the wavelength of the wave 218. Each echelon 214 is also positioned at an angle λ from the second centerline 219, with the angle being approximately 45 degrees, approximately 39.1 degrees, or any other value that directs or converts a portion of the wave 218 when the wave contacts a second echelon 214.

An end trapping slot 220 is positioned along the second centerline 219 after the last echelon in the second plurality of echelons 214. The end trapping slot 220 may be positioned at the same angle from the second centerline 219 as the second plurality of echelons 214. When the wave 218 propagates beyond the last echelon 214 of the second plurality of echelons, a reflective surface in the end trapping slot 220 reflects the wave 218 back toward the second wave generator 216. The first wave generator 204 and second wave generator 216 store the wave 218 directed back from the echelons 202 and 214 as pulse trains, in the memory of a control panel, as will be discussed.

Figure 2B:
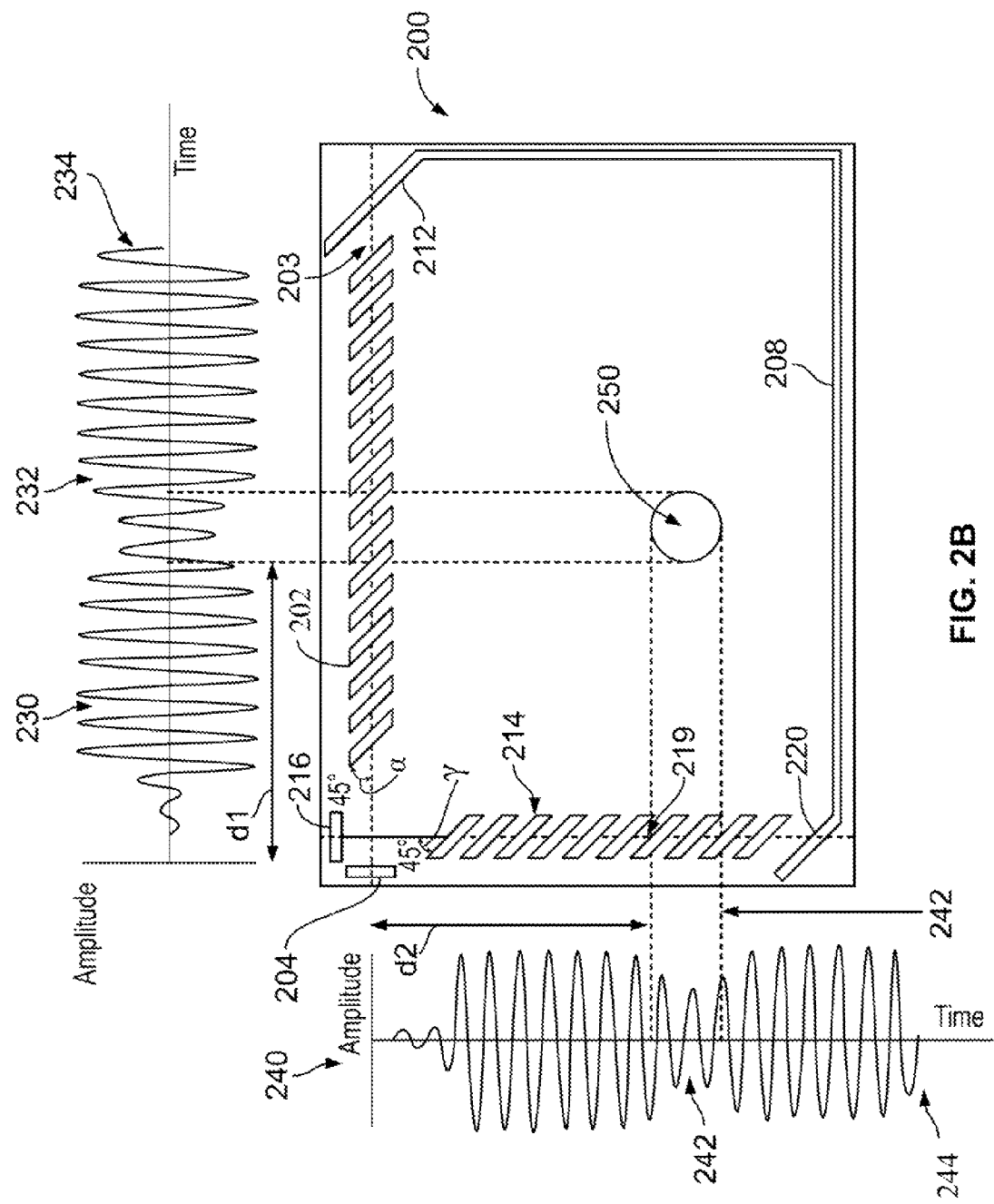
FIG. 2B illustrates the touch panel of FIG. 2A with the corresponding pulse trains generated when an object contacts the touch panel.

FIG. 2B illustrates the touch panel 200 with the pulse train 230 generated by the first wave generator 204, and the pulse train 240 generated by the second wave generator 216, overlaid on the touch panel 200. The horizontal axis of each pulse train 230 and 240 represents the time elapsed from the generation of the waves 206 and 218 onward, and the vertical axis represents the amplitude of the waves 206 and 218. Because the echelons 202 and 214 are separated by substantially the same distance, the position, or positions, where an object contacts the touch panel 200 can be determined by analyzing the pulse trains 230 and 240. Specifically, the time elapsed from the transmission of the wave 206 by the first wave generator 202 to a decrease in the amplitude of the first wave 206 in the pulse train 230, and the time elapsed from the transmission of the wave 218 by the second wave generator 216 to a decrease in the amplitude of the second wave 218 in the pulse train 240 can be plotted as two coordinates in a Cartesian coordinate system overlaid on the touch panel 200, with the intersection of the first and second centerlines being the point of origin (i.e. 0, 0). Accordingly, the exact region where an object 250 has contacted the touch panel 200 can be determined. It will be understood by those skilled in the art that the edges of the panel or substrate can be substituted as reflectors to redirect the waves, and that the trapping slots may be useful when it is not practical to do so.

Returning to FIG. 2B, the object 250 contacting the touch panel 200 is reflected in the pulse trains 230 and 240 as a decrease in amplitude as indicated at 232 and 242. Because the amplitude of the pulse train in the areas of the touch panel 200 in contact with the object 250 is diminished, the location of the object 250 on the touch panel 200 can be ascertained.

For example, a distance d1, representing a distance from the first wave generator to the object 250 along the first centerline 203, is determined by dividing the velocity of a wave generated by the wave generator 204 by the time elapsed from the generation of the wave until the decrease in amplitude 232. Similarly, a distance d2, representing a distance from the second wave generator 216 to the object 250 along the second centerline 219, can be determined by analyzing the pulse train 240 in the same manner as pulse train 230. The location of the object 250 on the touch panel 200 can be determined by measuring the distance d1 along the first centerline 203 in a direction toward the first plurality of echelons 202, and measuring the distance d2 along the second centerline 219 in a direction toward the second plurality of echelons 214. The intersection of these two distances d1 and d2 identifies the location of the object 250.

In directing the waves 206 and 218 toward the trapping slots 212 and 220, the echelons 202 and 214 may convert the wave 206 or 218 into another order or waveform. For example, the echelons 202 and 214 may convert a zeroth order shear wave into an anti-symmetric, first order Lamb shear wave. The order, or mode, of the waves converted by each of the plurality of echelons 202 and 214 is not limited, and includes all higher orders of waves. As another example, each of the plurality of echelons 202 and 214 may convert a first order wave into a fourth order wave that is directed toward the trapping slots 212 and 220. Each of the plurality of echelons 202 and 214 may also convert a higher order wave into a lower order wave. Each of the plurality of echelons 202 and 214 may also reflect a wave toward the trapping slots 212 and 220 without performing any conversion of the wave. In addition, each of the plurality of echelons 202 and 214 may convert a symmetrical shear wave into an anti-symmetrical shear wave. Further, each wave generator 204 and 216 may produce compression waves, as opposed to shear waves. The conversion of acoustic waves from one mode to another is disclosed in copending application to Knowles, U.S. patent application Ser. No. 13/677,086, which is incorporated herein by reference in its entirety.

Figure 3:
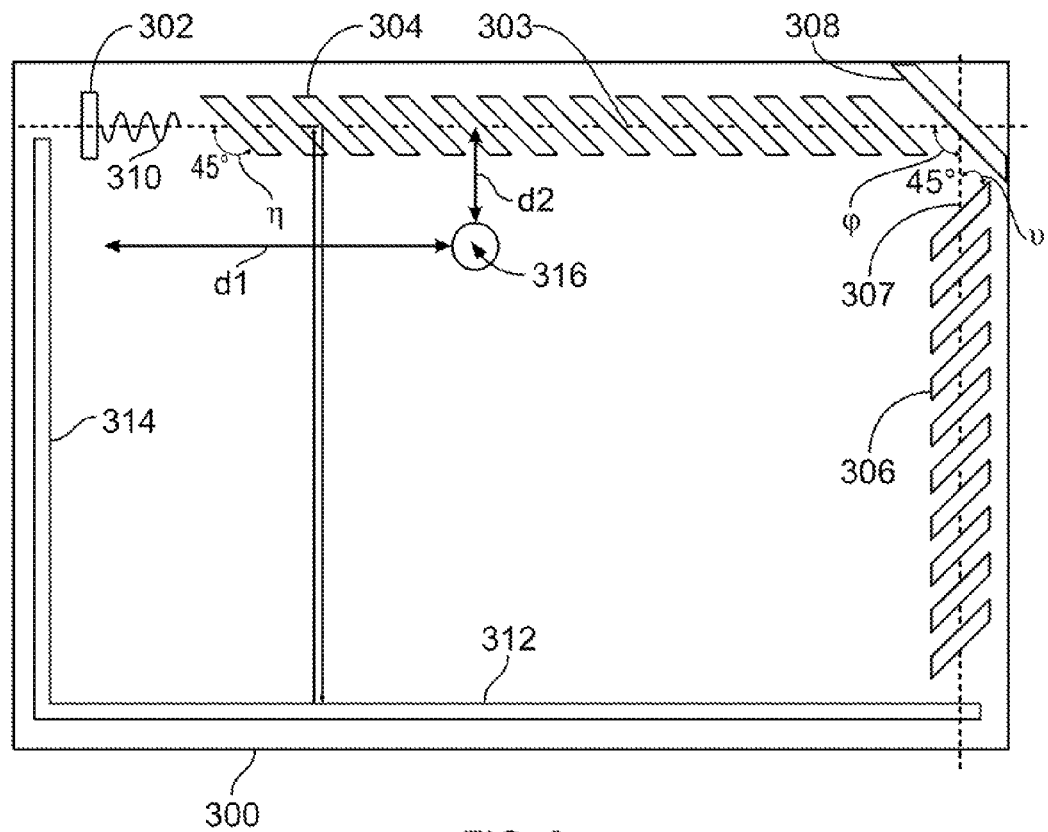
FIG. 3 illustrates a touch panel having a single wave generator and a trapping slot.

FIG. 3 illustrates a touch panel 300 having a wave generator 302. The wave generator 302 is positioned at one end of a first plurality of echelons 304 with each echelon 304 in the first plurality of echelons arranged along a first centerline 303 and separated from adjacent echelons 304 by substantially equal distances. The width of each echelon 304 may be set to approximately two times the wavelength of a wave generated by the wave generator 302. Each echelon 304 is also positioned at an angle η from the first centerline 303, with the angle being approximately 45 degrees, approximately 39.1 degrees, or any other value that directs, or converts, a portion of a wave generated by the wave generator 302 when the wave contacts an echelon 304.

A second plurality of echelons 306 is arranged along a second centerline 307, with each of the echelons in the second plurality of echelons 306 being separated by substantially the same distance. The second centerline 307 is positioned at an angle φ in relation to the first centerline 303. The second centerline 307 may be substantially orthogonal to the first centerline 303. The width of each echelon 306 may be set to approximately two times the wavelength of a wave generated by the wave generator 302. Each echelon 306 is also positioned at an angle ε from the second centerline 307, with the angle being approximately 45 degrees, approximately 39.1 degrees, or any other value that directs or converts a portion of the wave when the wave contacts a second echelon 306.

A directing echelon 308 is positioned at the end of the first plurality of echelons 304 opposite the wave generator 302, and between the first plurality of echelons 304 and second plurality of echelons 306. The directing echelon 308 is configured to direct a wave 310 transmitted from the wave generator 302 from the last echelon in the first plurality of echelons 304 towards a first echelon in the second plurality of echelons 306. The directing echelon 308 may also convert the wave 310 from the first plurality of echelons 304 into another waveform, as previously discussed, before directing the wave towards the second plurality of echelons 306.

The wave generator 302 generates the wave 310 that propagates down the first centerline 303 across each of the first plurality of echelons 304. As the wave 310 contacts each of the first plurality of echelons 304, a portion of the wave 310 is directed towards a first trapping slot 312 positioned opposite the first plurality of echelons 304. The first trapping slot 312 is configured, as previously discussed, to prevent propagation of a portion of the wave 310 beyond the first trapping slot 312. Further, a reflective side surface of the trapping slot reflects the portion of the wave 310 back towards the first plurality of echelons 302.

After the wave 310 contacts the last echelon 304 in the first plurality of echelons 302, the wave 310 is redirected toward the second plurality of echelons 306 by the reflecting echelon 310. As the wave 310 contacts each of the second plurality of echelons 306, a portion of the wave 310 is direct toward a second trapping slot 314. The second trapping slot 314 prevents the portion of the wave 310 directed toward the second trapping slot 314 from propagating beyond the second trapping slot 314. A reflective surface in the second trapping slot 314 reflects the portion of the wave 310 back towards the second plurality of echelons 306. The first trapping slot 312 is configured such that one end of the first trapping slot 312 extends beyond the last echelon 306. As the wave 310 propagates beyond the last echelon 306, the first trapping slot 312 reflects the wave 310 back toward the redirecting echelon 308, which directs the wave 310 back toward the transducer 302. The redirecting echelon 308 may also be a trapping slot having a reflective surface that reflects the wave 310 towards the second plurality of echelons 304.

Figure 4:
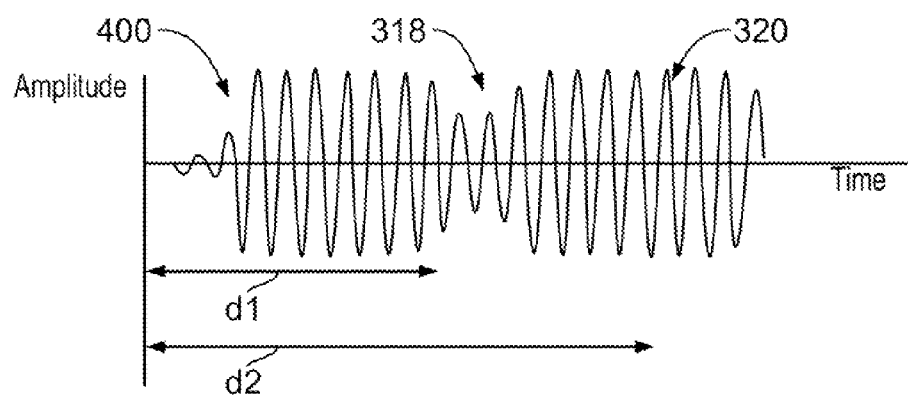
FIG. 4 depicts the pulse train generated by the touch panel of FIG. 3.

FIG. 4 illustrates a pulse train 400 generated by the wave 310. The amplitude of the pulse train 400 remains constant as the wave 310 propagates across each of the echelons 304 and 306. When the wave 310 encounters an object 316 on the touch panel 300, the object 316 is reflected in the pulse train 400 as a decrease in the amplitude of the pulse train 400 as seen at 318 and 320. The first decrease in amplitude 318 represents the location of the object 316 in relation to the first plurality of echelons 304, and the second decrease in amplitude 320 represents the location of the object 316 in relation to the second plurality of echelons 320.

Since the length of the array of echelons 304 and 306 and the velocity of the wave 310 are known, the position of the object 316 in relation to the first and second plurality of echelons 304 and 306 can be determined. By determining the distance d1 from the wave generator 302 to the first decrease in amplitude 318, based on the velocity of the wave 310, the position of the object 316 along the first plurality of echelons 304 is determined. The position of the object 316 in relation to the second plurality of echelons 306 is similarly determined using the distance d2 from the wave generator 302 to the second decrease in amplitude 320. Accordingly, the distance d1 may be measured from the wave generator 302 in the direction of the first plurality of echelons 304, and the distance d2 may be measured from the first centerline 303 in the direction of the second plurality of echelons 306 to determine the position of the object 316 on the touch panel.

Figure 5:
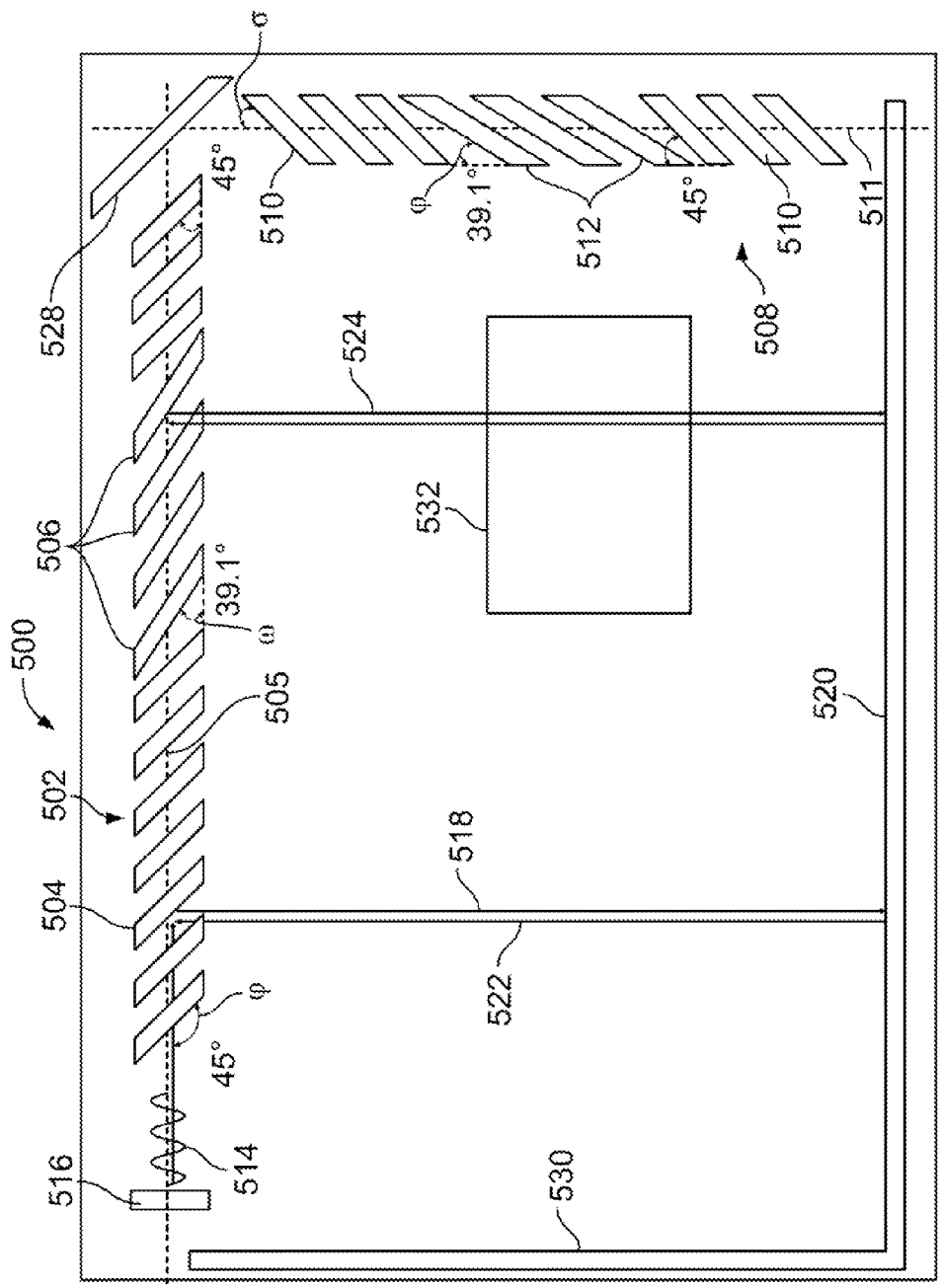
FIG. 5 illustrates a touch panel having an area with an elevated sensitivity to touch.

FIG. 5 illustrates a touch panel 500 having a high sensitivity touch area. The touch panel includes a plurality of first echelons 502 arranged along a first centerline 505 in a manner similar to the touch panel 300 of FIG. 3. To create a high sensitivity area on the touch panel 500, a first group of echelons 504 in the first plurality of echelons 502 is arranged at a first angle ψ relative to the first centerline 505, and a second group of echelons 506 in the first plurality of echelons 502 is arranged at a second angle ω relative to the first centerline 505.

The touch panel 500 also includes a second plurality of echelons 508 arranged along a second centerline 511, where the second centerline 511 is substantially orthogonal to the first centerline 505. The second plurality of echelons 508 also includes a first group of echelons 510 arranged at a first angle α relative to the second centerline 511, and a second group of echelons 512 arranged at a second angle χ relative to the second centerline 511. The first angle, or second angle, of the first and second plurality of echelons 502 and 508 may be set to a value that directs a wave 514 generated by the wave generator 516 toward the trapping slots 520 and 530 without converting the wave 514 generated by the wave generator 516 to another wave form or wave mode. The first angle, or second angle, may also be set to a value where the wave 514 is converted to a higher order mode, or to another waveform, when the wave 514 contacts an echelon 506 or 512.

As an illustrative example, the first angle may be approximately 45 degrees, the second angle may be approximately 39.1 degrees, and the wave generator 516 may produce a zeroth order shear wave 514 that propagates along the first centerline 505 of the first plurality of echelons 502. As the zeroth order shear wave 514 contacts each echelon 504, the wave 518 is directed toward the first trapping slot 520. A reflective side surface in the trapping slot 520 reflects the wave 522 back toward the echelon 504 and the echelon 504 directs the wave back toward the wave generator 516.

As the wave 514 contacts the second group of echelons 506, each echelon 506 converts the zeroth order shear wave 514 into an anti-symmetric, first order Lamb flexural wave 524 that is directed toward the first trapping slot 520. A reflective side surface in the first trapping slot 520 reflects the first order Lamb flexural wave 524 back to the echelon 506 where it is converted back to a zeroth order shear wave 514 and is directed back to the wave generator 516 by the echelon 506.

The wave 514 is directed, or reflected, toward the second plurality of echelons 508 by a redirecting echelon 528. The wave 514 is directed to a second trapping slot 530 as the wave 514 contacts each of the echelons 510. A reflective surface in the trapping slot 530 reflects the wave 514 back to the echelon 510 in the same manner discussed for the first group of echelons 504 in the first plurality of echelons 502. Similarly, the second group of echelons 512 direct and covert the wave 514 in the same manner discussed for the second group of echelons 504 in the first plurality of echelons 502.

Because a Lamb flexural wave is sensitive to touch, the area on the touch panel 500 between the second groups of echelons 506 and 512 is defined as a touch sensitive area 532. The touch sensitive area 532 requires less contact to affect the amplitude of the pulse train associated with the wave 516. It will be appreciated by those skilled in the art that when a user slides a finger across the touch panel 500, the amount of force applied to slide a finger is less than the force applied to press the touch panel 500 with no movement. Accordingly, sliding a finger across an in plane acoustic touch panel may not be detectable in the pulse train of the wave. By increasing the sensitivity to touch in specific areas on the touch panel 500, via conversion to an out of plane mode, the pulse train of the wave registers finger movement, making the identification of a sliding finger on a touch panel 500 possible.

Figure 6:
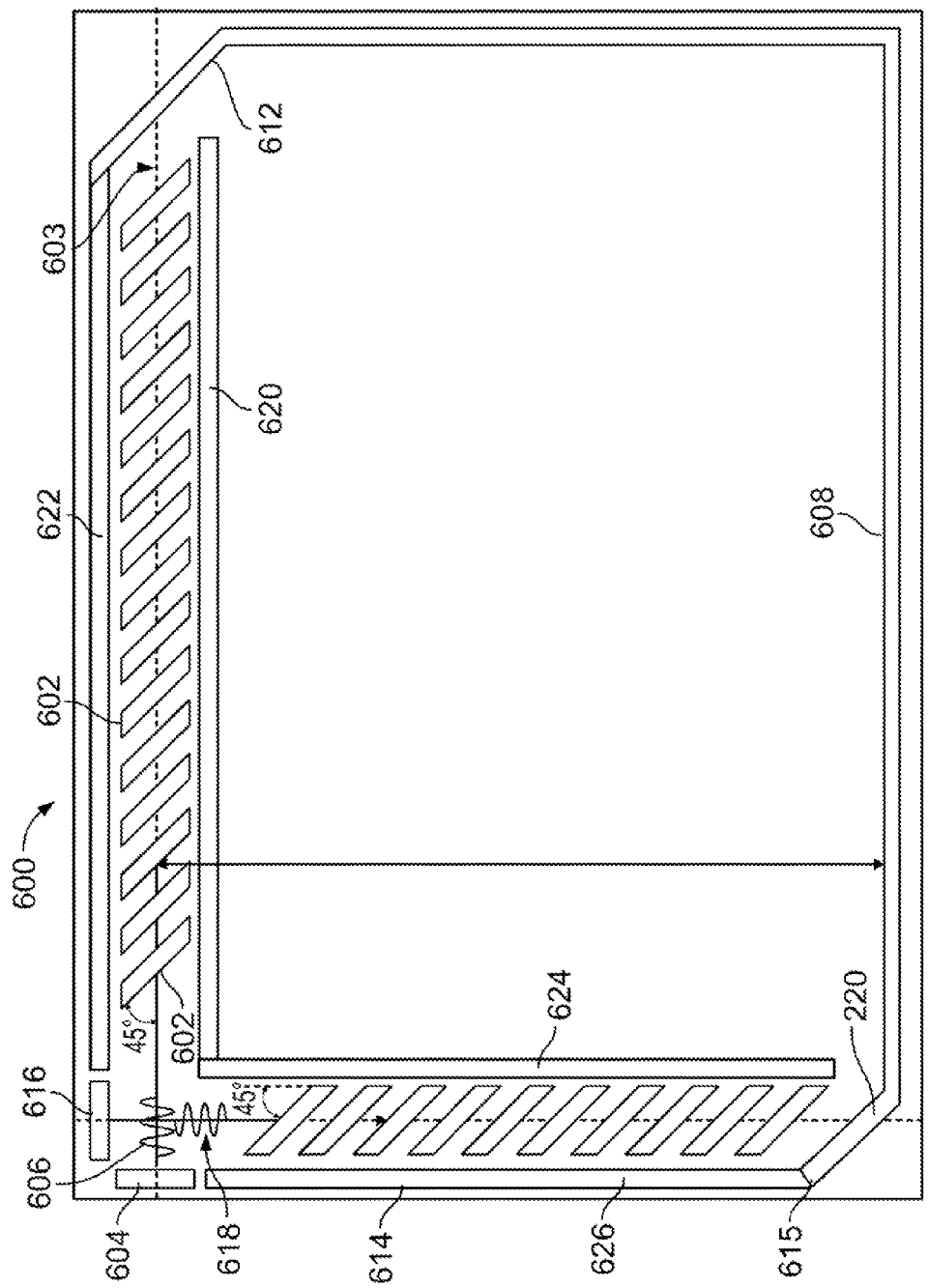
FIG. 6 illustrates a touch panel having a wave generator and containment slots.

FIG. 6 illustrates a touch panel 600 having containment slots on opposing sides of a first plurality of echelons and a second plurality of echelons. The touch panel 600 includes a first plurality of echelons 602 arranged along a first centerline 603, with each echelon 602 being positioned at an angle from the first centerline 603. Each of the echelons in the first plurality of echelons 602 is separated by substantially the same distance. A first wave generator 604 is positioned on the touch panel at one end of the first plurality of echelons 602 such that the first wave generator 604 transmits a wave 606 along the first centerline 603 of the first plurality of echelons 602. The wave 606 may be a higher order shear wave.

As the wave 606 contacts each of the plurality of first echelons 602, each echelon 602 directs a portion of the wave 606 towards a trapping slot 608 positioned on a side of the touch panel 600 opposite the first plurality of first echelons 602. The trapping slot 608 prevents the wave 606 from propagating beyond the trapping slot 608. A reflective side surface in the trapping slot 608 reflects the wave 608 back towards the echelon 602, which then directs the wave back to the first wave generator 604. An end trapping slot 612 is positioned along the first centerline after the last echelon in the first plurality of echelons 602. The end trapping slot 612 is arranged such that it is positioned at the same angle from the first centerline 603 as the first plurality of echelons 602. When the wave 606 propagates beyond the last of the first plurality of echelons 602, the end trapping slot 612 directs the wave 606 back to the wave generator 204.

A second plurality of echelons 614 are arranged along a second centerline 615, with each of the echelons in the second plurality of echelons 614 being separated by substantially the same distance. The second centerline 615 is positioned at angle in relation to the first centerline 603. The second centerline 615 may be substantially orthogonal to the first centerline 603. A second wave generator 616 is positioned on one end of the plurality of second echelons 614 such that the second wave generator 614 transmits a wave 618 along the second centerline 615.

First containment slots 620 and 622 are positioned on opposing sides of the first plurality of echelons 602, and second containment slots 624 and 626 are positioned on opposing sides of the second plurality of echelons 614. The containment slots 620, 622, 624 and 626 are configured to allow at least one order of the waves 606 and 618 to propagate beyond the containment slots 620, 622, 624 and 626, and to prevent at least one order of waves 606 and 618 from propagating beyond the containment slots 620, 622, 624 and 626. The wave generators 604 and 616 each generate waves at modes that do not propagate beyond the containment slots 620, 622, 624 and 626. Each of the first plurality of echelons 602 and second plurality of echelons 614 are configured to convert the waves 606 and 618 into modes that can propagate past the containment slots 620 and 624 when a wave contacts the echelons 602 and 624. When the containment slots 620, 622, 624 and 626 are arranged in this manner, the response amplitudes from the waves 606 and 618 are maintained for a greater distance.

Signal amplitude deteriorates as the size of the touch panel 600 increases due to several reasons. First, in the absence of losses due to the touch panel 600 substrate, the pulse train amplitude from a wave propagating down a touch panel is proportional to length of the array of echelons divided by the width of the array of echelons. Acoustic energy, which decreases with increased panel length, also contributes to amplitude deterioration. Also, diffraction of energy from the plurality of echelons 602 and 614 also results in the deterioration of signal amplitude. Based on these factors, the signal amplitude decreases substantially with larger acoustic touch panels. By generating a higher order mode from the wave generators 604 and 616, and incorporating the containment slots 620, 622, 624 and 626, the length of the touch panel can be increased, because diffraction of energy has been repressed, without deterioration of signal amplitude. Accordingly, utilizing containment slots as discussed herein, allows for larger acoustic touch panels than had previously been possible.

Figure 7:
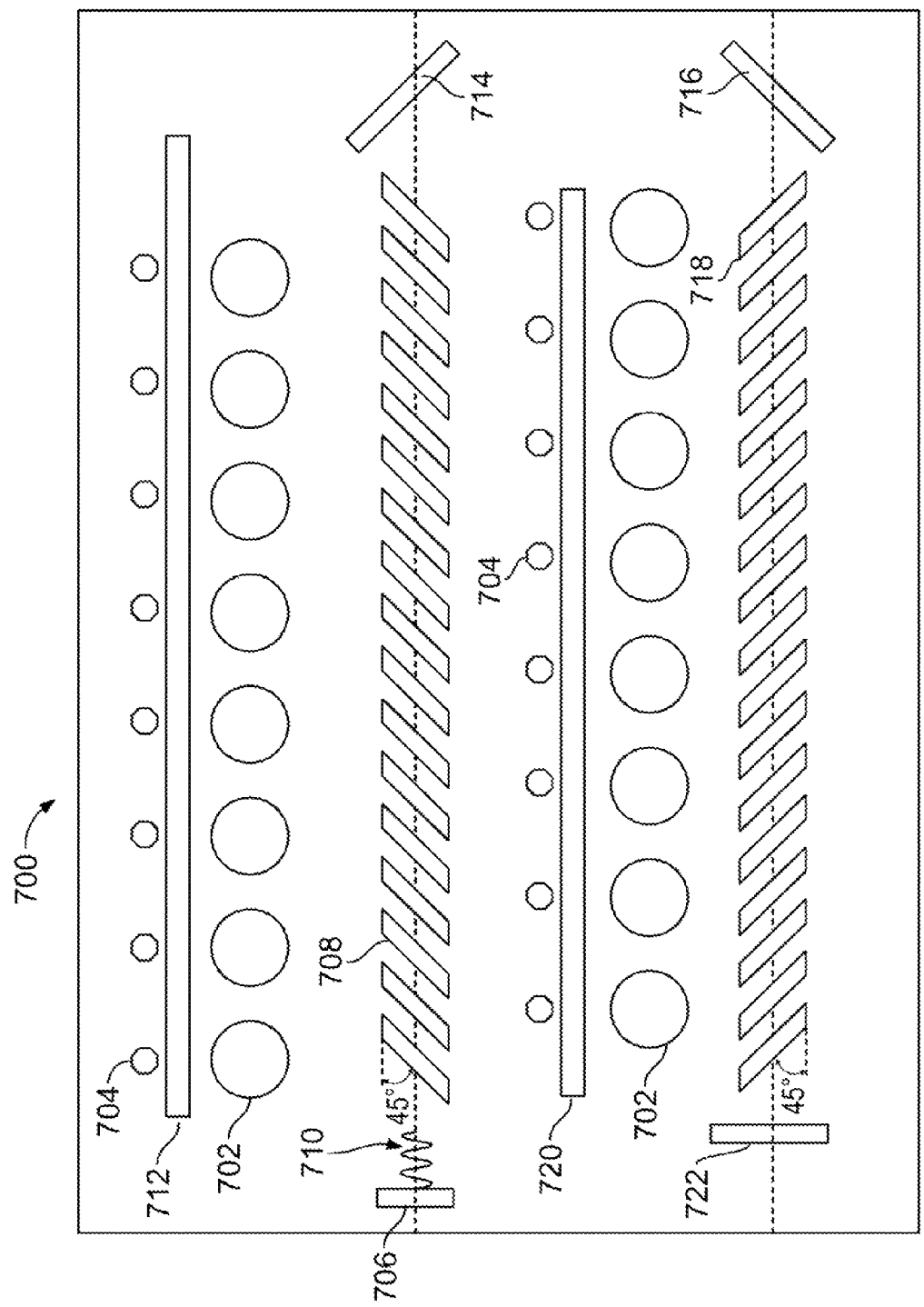
FIG. 7 illustrates a touch panel having a plurality of touch locations and light emitting devices.

FIG. 7 illustrates a touch panel 700 having a plurality of touch locations 702 and associated lighting elements 704. A wave generator 706 is positioned on the touch panel 700 on one end of a first plurality of echelons 708, with the first plurality of echelons 708 being arranged along a first centerline 709. Each echelon 708 is also positioned at an angle from the first centerline 709, with the angle being approximately 45 degrees, approximately 39.1 degrees, or any other value that directs or converts a portion of a wave generated by the wave generator 706 when the wave contacts an echelon 708. Each echelon in the first plurality of echelons 708 is positioned such that each echelon 708 may direct a portion of a wave 710 towards at least one of the touch locations 702. The touch locations 702 are separated from a plurality of light emitting elements 704 by a trapping slot 712 that includes at least one reflective side surface.

A redirecting echelon 714 is positioned on the end of the plurality of first echelons 708 opposite the wave generator 704 such that the redirecting echelon 714 directs the wave 710 from the wave generator 704 towards a second redirecting echelon 716, with the second redirecting echelon 716 directing the wave 710 toward a second plurality of echelons 718. A plurality of touch locations 702 is positioned on a side of the second plurality of echelons 718 furthest from the first plurality of echelons 708 such that the wave 710 directed from the second plurality of echelons 718 is directed toward the touch locations 702. A second trapping slot 720 is positioned on the side of the touch locations 712 furthest from the second plurality of echelons 718. A plurality of lighting elements 704 is positioned between the second trapping slot 720 and the first plurality of echelons 708.

The wave generator 706 is configured to produce a wave 710 that propagates along the first centerline 703 of the first plurality of echelons 708. As the wave 710 contacts each echelon 708, a portion of the wave is directed towards the trapping slot 712. The trapping slot 712 is configured to prevent the wave 710 from propagating beyond the trapping slot 712. The trapping slot 712 also includes a reflective side surface that reflects the wave 710 back toward the echelon 708 where it is directed back to the wave generator 706. When the wave 710 reaches the end of the first plurality of echelons 708, a first redirecting echelon 714 directs the wave 710 towards a second redirecting echelon 716. The redirecting echelons 714 and 716 can also be trapping slots having reflective surfaces that reflect the wave 710 from the first redirecting trapping slot 714 toward the second redirecting trapping slot 716. When the wave 710 reaches the end of the second plurality of echelons 718, a reflecting echelon 722 reflects the wave 710 back toward the wave generator 706.

Figure 8:
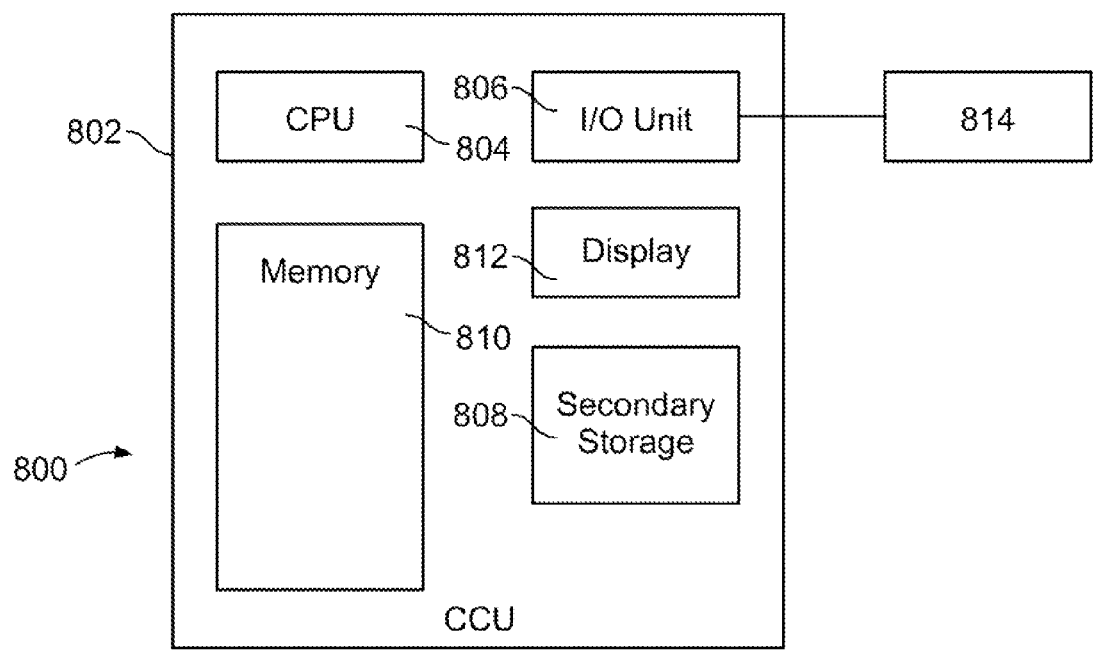
FIG. 8 shows a control unit used to control a wave generator.

FIG. 8 illustrates an embodiment of a control panel 800 used to monitor and control a wave generator 814. The control panel 800 includes a central control unit 802 that is electrically coupled to the wave generator 814. The central control unit 802 (CCU) includes a central processing unit (CPU) 804, an input output (I/O) unit 806, a secondary storage device 808, and a memory 810. The central control unit 802 may also include a digital display 812. Central control unit 802 may further include standard input devices such as a keyboard, a mouse, a digitizer, or a speech processing means (each not illustrated). The I/O unit 806 may further include a plurality of analog outputs that provides a variable voltage or current to the wave generator 814.

The control panel 800 transmits a signal to a wave generator 814 to generate different waves having different waveforms and modes. A pulse train sensor 816 coupled to the I/O unit 806 of the control panel 800 captures and stores the reflected pulse train in the memory 810. Software operating in the CPU 804 analyzes the returning pulse train to determine the point where the amplitude of the pulse train increases indicating an object is in contact with the touch panel.

Figure 9A:
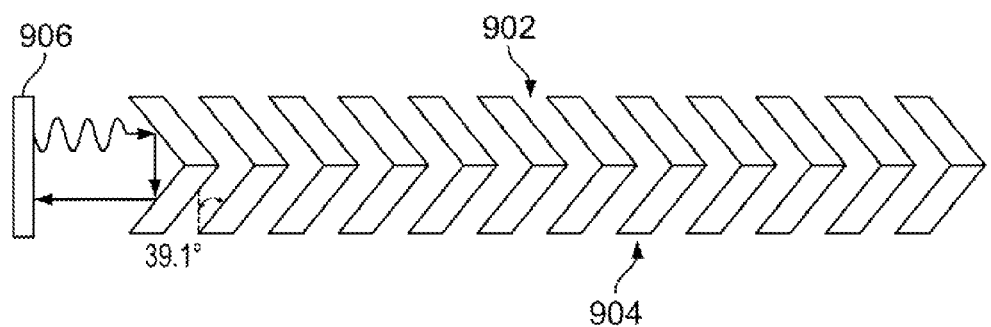
FIG. 9A illustrates an embodiment of the device in which array pairs contact one another with a single transducer, and in which shear waves are reflected and simultaneously converted to the Lamb mode $A_0$, and in which the conversion is the result of the angle of the transducer to the shear wave with a 39.1° angle.
Figure 9B:
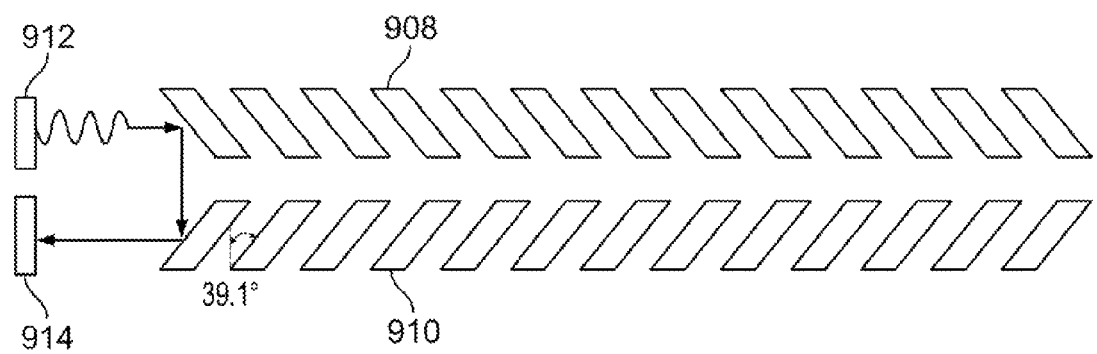
FIG. 9B is a view similar to FIG. 9A, in which the array pairs are spaced from one another.

Another embodiment of the panel is illustrated in FIGS. 9A-9D. As seen in FIG. 9A, two arrays 902, 904 are formed parallel to each other, with a single transducer 906, and with the echelons set to convert higher order shear to first order flexural, which is a Lamb mode designated $A_o$. The conversion is the result of the angle of the transducer to the shear wave at an angle of 39.1°. The transducer 906 is configured for excitation and detection of wave motion. FIG. 9B illustrates a configuration similar to FIG. 9A, but in which the array pairs 908, 910 are spaced from one another and includes two transducers 912, 914, one for excitation (912) and one for detection (914).

Figure 9C:
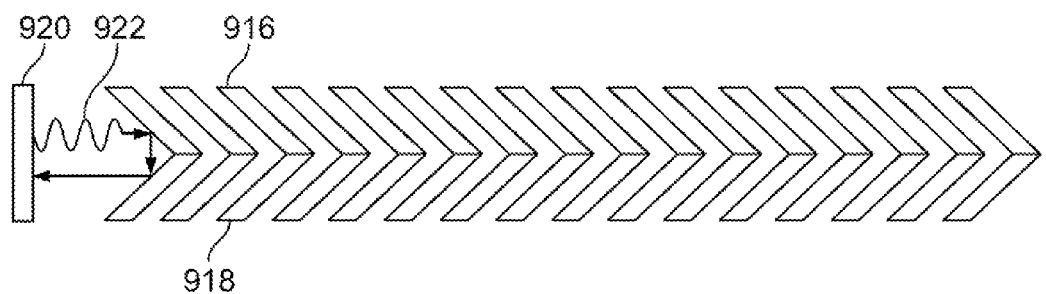
FIG. 9C illustrates an embodiment of the device in which array pairs contact one another with a single transducer, and in which shear waves are propagated by the transmit transducer travel into the transmitting array and are reflected by a 45° reflector out of the array to the receiving array and back to the receiving transducer.
Figure 9D:
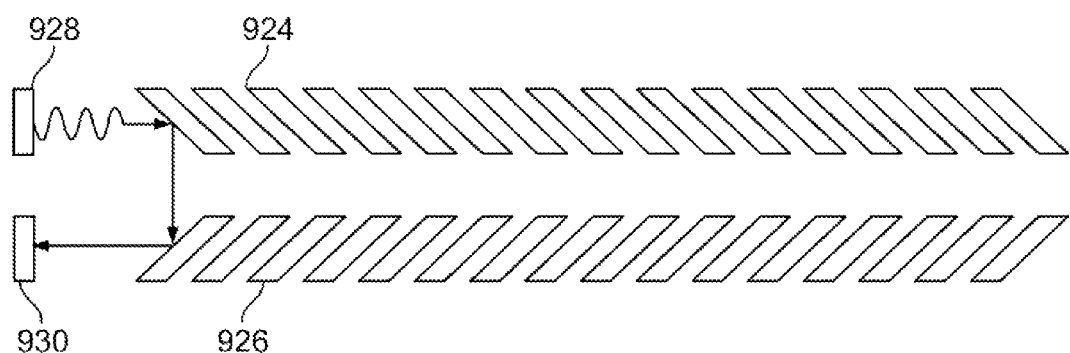
FIG. 9D is a view similar to FIG. 9C, in which the array pairs are spaced from one another

FIG. 9C illustrates an embodiment of the panel in which array pairs 916, 918 contact one another with a single transducer 920. In this embodiment shear waves 922 propagated by the transmit transducer 920 travel into the transmitting array 916 and are reflected by a 45° reflector out of the array to the receiving array 918 and back to the transducer 920. FIG. 9D illustrates an embodiment similar to that shown in FIG. 9C, except that the arrays 924 and 926 are spaced from one another and two transducers are used, an excitation transducer 928 and a detection transducer 930.

The arrays 902, 904, 908, 910, 916, 918, 924 and 926 create a touch sensitive strip the length of the array, similar in sensitivity to a Rayleigh touch screen. These array pairs can be produced in rows as seen in the exemplary configurations shown in FIGS. 9A-9D to provide a touch sensitive field as sensitive as a Rayleigh wave touch screen, but less susceptible to acoustic absorption by spurious surface contaminants.

All of the above-described embodiments can be used to, for example, provide a thin rugged keyboard and/or touch pad. Such a keyboard and/or touch pad has the additional feature in that a fingertip spreads as the touch pressure is increased, and this increases the amount of acoustic energy absorbed, because the absorbing surface area expands. The increased absorption can be readily detected, allowing for pressure sensitive functions, such as increasing screen rolling rates with increased finger pressure.

Figure 10:
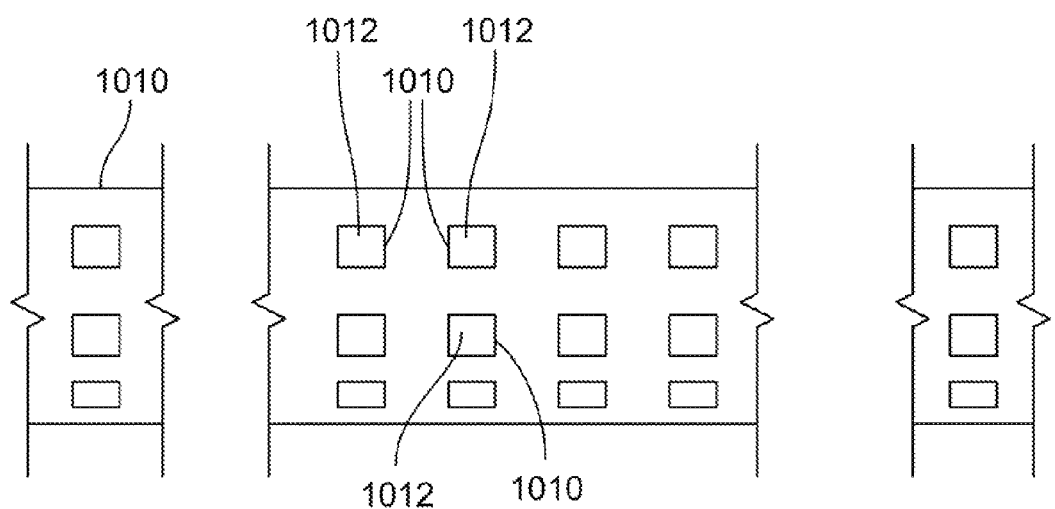
FIG. 10 is an exemplary illustration of a keyboard incorporating a touch screen.
Figure 11:
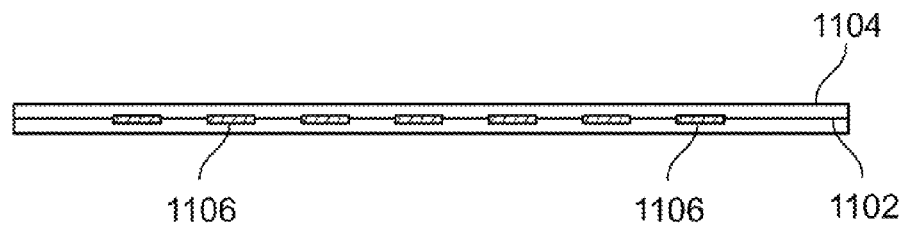
FIG. 11 is a cross-sectional illustration of one touch panel with an elastomeric sheet overlying the panel.

One problem encountered with typing on a flat keyboard is that a user's fingers can slide and move, and there is no tactile feedback to help position the user's fingers. As illustrated in FIG. 10, this can be alleviated by, for example, printing or otherwise forming small ridges 1010 of an elastomeric material around each key 1012 to prevent sliding and to provide some measure of tactile feedback. Silicone based elastomers absorb very little in plane wave energy and have minimal effects on the operation of these sensors. It has also been observed that striking or vibrating the back of the substrate in the vicinity of the touch location when touch action occurs produces a sensation of motion or travel in the substrate, providing tactile feedback.

An alternative embodiment is to overlay the substrate surface 1102 with an elastomeric sheet 1104 with, for example, absorbing patches 1106 on the underside of the sheet 1104 to absorb in plane wave energy at the touch key positions. The sheet can be embossed or molded to form raised or depressed regions and/or shapes at the key positions, with ridges and travel when depressed. The overlay sheet can be permanently attached or removable, as desired.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:
1. A touch panel comprising:
a substrate having a thickness;
a first plurality of echelons arranged on the substrate along a first centerline, each echelon in the first plurality of echelons being arranged at a first angle in relation to the first centerline;

a first shear wave generator on an end of the substrate configured to transmit a first shear wave along the first centerline of the first plurality of echelons;

a second plurality of echelons arranged on the substrate along a second centerline, each echelon in the second plurality of echelons being arranged at a second angle in relation to the second centerline;

a second shear wave generator on an end of the substrate configured to transmit a second shear wave along the second centerline of the second plurality of echelons;

a first trapping slot positioned parallel to the first plurality of echelons and spaced from the first and second shear wave generators, the first trapping slot formed in the substrate such that the substrate within the first trapping slot has a thickness less than the thickness of the substrate; and a second trapping slot positioned parallel to the second plurality of echelons and spaced from the first and second shear wave generators, the second trapping slot formed in the substrate such that the substrate within the second trapping slot has a thickness less than the thickness of the substrate, and wherein one or both of the first and second trapping slots have at least one reflective side surface to reflect a portion of the first or second shear wave, and wherein the first and second trapping slots are configured to prevent the first or second shear waves directed from the respective first or second echelons from propagating past the respective first or second trapping slots.

2. The touch panel of claim 1 wherein the first angle and second angle are set to approximately 45 degrees.

3. The touch panel of claim 1 wherein the first angle and second angle are set to approximately 39.1 degrees.

4. The touch panel of claim 1 wherein the first centerline is substantially orthogonal to the second centerline.

5. The touch panel of claim 1 wherein the first shear wave generator and second shear wave generator are transducers.

6. The touch panel of claim 1 wherein an echelon in the first plurality of echelons furthest from the first shear wave generator is configured to reflect the first shear wave back to the first shear wave generator.

7. The touch panel of claim 6 wherein an echelon in the second plurality of echelons furthest from the second shear wave generator is configured to reflect the second shear wave back to the second shear wave generator.

8. The touch panel of claim 1 including a pair of containment slots positioned parallel to the first centerline on opposing sides of the first plurality of echelons, the containment slots configured to prevent propagation of at least one mode of the first shear wave beyond the containment slots and to allow propagation of at least one mode of the first shear wave beyond the containment slots.

9. The touch panel of claim 1 including a pair of containment slots positioned parallel to the second centerline on opposing sides of the second plurality of echelons, the containment slots configured to prevent propagation of at least one mode of the second shear wave beyond the containment slots and to allow propagation of at least one mode of the second shear wave beyond the containment slots.

10. The touch panel of claim 1 wherein at least one side of the substrate is beveled.

11. The touch panel of claim 1 wherein the touch panel is formed as a keyboard.

12. The touch panel of claim 1 wherein the touch panel is formed in a substrate and including an elastomeric overlay on the substrate.

13. The touch panel of claim 12 including ridges formed on the elastomeric overlay.

14. A touch panel comprising:

a first plurality of echelons arranged on a substrate along a first centerline, each echelon in the first plurality of echelons arranged at a first angle in relation to the first centerline;

a second plurality of echelons arranged on the substrate along a second centerline, each echelon in the second plurality of echelons arranged at a second angle in relation to the second centerline;

a shear wave generator on an end of the first plurality of echelons configured to transmit a shear wave along the first centerline of the first plurality of echelons;

a redirecting echelon between the first plurality of echelons and the second plurality of echelons configured to direct a shear wave from the shear wave generator to the second plurality of echelons;

a first trapping slot positioned parallel to the first plurality of echelons and spaced from the shear wave generator, the first trapping slot formed in the substrate such that the substrate within the first trapping slot has a thickness less than the thickness of the substrate; and a second trapping slot positioned parallel to the second plurality of echelons and spaced from the shear wave generator, the second trapping slot formed in the substrate such that the substrate within the second trapping slot has a thickness less than the thickness of the substrate, and wherein one or both of the first and second trapping slots have at least one reflective side surface to reflect a portion of the first or second shear wave, and wherein the first and second trapping slots are configured to prevent the first or second shear waves directed from the respective first or second echelons from propagating past the respective first or second trapping slots.

15. The touch panel of claim 14 wherein the first angle and the second angle are set to approximately 45 degrees.

16. The touch panel of claim 14 wherein the first angle and the second angle are set to approximately 39.1 degrees.

17. The touch panel of claim 14 wherein the first centerline is substantially orthogonal to the second centerline.

18. The touch panel of claim 14 wherein an end of the first trapping slot extends beyond an echelon in the second plurality of echelons furthest from the redirecting echelon and reflects the shear wave back to the shear wave generator.

19. The touch panel of claim 14 wherein the shear wave generator is a transducer.

20. The touch panel of claim 14 wherein the redirecting echelon is a trapping slot having a reflective side surface configured to reflect the shear wave from the first plurality of echelons to the second plurality of echelons.

21. The touch panel of claim 14 wherein a plurality of echelons in the first plurality of echelons are positioned at an angle different than the first angle, and a plurality of echelons in the second plurality of echelons are positioned at an angle different than the second angle.

22. The touch panel of claim 14 wherein at least one side of the substrate is beveled.

23. A touch panel comprising:

a first plurality of echelons arranged on a substrate along a first centerline, each echelon in the first plurality of echelons arranged at a first angle in relation to the first centerline;

a second plurality of echelons arranged on the substrate along a second centerline, each echelon in the second plurality of echelons arranged at a second angle in relation to the second centerline;

a shear wave generator affixed to an end of the substrate at an end of the first plurality of echelons configured to transmit a shear wave along the first centerline of the first plurality of echelons;

a first redirecting echelon on the first centerline adjacent to an echelon of the first plurality of echelons furthest from the shear wave generator;

a second redirecting echelon on the second centerline positioned to direct the shear wave from the first redirecting echelon to the second plurality of echelons;

a first trapping slot positioned parallel to the first plurality of echelons and spaced from the shear wave generator, the first trapping slot formed in the substrate such that the substrate within the first trapping slot has a thickness less than the thickness of the substrate;

a plurality of first touch areas positioned between the first trapping slot and the first plurality of echelons;

a plurality of light emitting elements positioned on a side of the first trapping slot opposite the side closest to the first touch areas;

a second trapping slot positioned parallel to the second plurality of echelons and spaced from the shear wave generator, the second trapping slot formed in the substrate such that the substrate within the second trapping slot has a thickness less than the thickness of the substrate;

a plurality of second touch areas positioned between the second trapping slot and the second plurality of echelons; and a plurality of light emitting elements positioned on a side of the second trapping slot opposite the side closest to the second touch areas, wherein one or both of the first and second trapping slots have at least one reflective side surface to reflect a portion of the first or second shear wave, and wherein the first and second trapping slots are configured to prevent the first or second shear waves directed from the respective first or second echelons from propagating past the respective first or second trapping slots.

\* \* \* \* \*

UNITED STATES PATENT AND TRADEMARK OFFICE
CERTIFICATE OF CORRECTION

PATENT NO.       : 9,658,719 B2
APPLICATION NO.  : 13/709892
DATED            : May 23, 2017
INVENTOR(S)      : Terence J. Knowles It is certified that error appears in the above-identified patent and that said Letters Patent is hereby corrected as shown below:

In the Specification

Column 5, Line 62, "216." to read as --220.--.

Signed and Sealed this
Twelfth Day of December, 2017

Joseph Matal
*Performing the Functions and Duties of the
Under Secretary of Commerce for Intellectual Property and
Director of the United States Patent and Trademark Office*